United States Patent [19]

Hankinson

[11] Patent Number: 5,657,088
[45] Date of Patent: Aug. 12, 1997

[54] SYSTEM AND METHOD FOR EXTRACTING CAPTION TELETEXT INFORMATION FROM A VIDEO SIGNAL

[75] Inventor: Robert J. Hankinson, Carrollton, Tex.

[73] Assignee: Cirrus Logic, Inc.

[21] Appl. No.: 578,300

[22] Filed: Dec. 22, 1995

[51] Int. Cl.⁶ .................................................. H04N 7/08
[52] U.S. Cl. .................................................. 348/465; 348/468
[58] Field of Search .................. 348/465, 468, 348/553, 460, 466, 473, 478; 341/61; H04N 7/08, 1/087

[56] References Cited

U.S. PATENT DOCUMENTS

| | | | |
|---|---|---|---|
| 4,803,551 | 2/1989 | Park | 358/147 |
| 4,994,912 | 2/1991 | Lumelsky et al. | 358/140 |
| 5,249,164 | 9/1993 | Mark | 358/21 |
| 5,325,093 | 6/1994 | Takamori | 341/155 |
| 5,359,367 | 10/1994 | Stockhill | 348/552 |
| 5,371,545 | 12/1994 | Tults | 348/465 |
| 5,431,175 | 7/1995 | Koz | 348/552 |
| 5,463,423 | 10/1995 | Tults | 348/456 |
| 5,481,296 | 1/1996 | Cragun et al. | 348/13 |
| 5,517,249 | 5/1996 | Rodriguez-Cavazos et al. | 348/465 |
| 5,521,645 | 5/1996 | Ezaki | 348/463 |
| 5,555,028 | 9/1996 | McArthur | 348/468 |
| 5,561,469 | 10/1996 | Schultz | 348/465 |

FOREIGN PATENT DOCUMENTS 9202217  12/1992  WIPO .......................... H04N 7/087

OTHER PUBLICATIONS

Rosenthal, Steve, "Desktop TV: Ready for Prime Time?," PC Magazine, Apr. 16, 1991, p. 49.

*Primary Examiner*—Victor R. Kustak
*Attorney, Agent, or Firm*—Fulbright & Jaworski

[57] ABSTRACT

A clocking circuit for extracting data from a video signal where the data is imbedded with other data and where the clocking rate for obtaining the data is slow as compared to the actual data rate. The circuit derives a calculated starting point for the data, using a double sample rate and a derivative to determine the beginning of the first data pulse. A clock signal is then derived which is calculated to between the leading and trailing edges of any received data pulse.

17 Claims, 3 Drawing Sheets

SYSTEM AND METHOD FOR EXTRACTING CAPTION TELETEXT INFORMATION FROM A VIDEO SIGNAL

RELATED APPLICATION

This application is related to SYSTEM AND METHOD FOR DECODING A VIDEO SIGNAL, filed concurrently with this application and hereby incorporated by reference herein. These applications are commonly assigned.

TECHNICAL FIELD OF THE INVENTION

This invention relates to a system and method for extracting inter frame bits from a video signal and more specifically to a system and method for extracting such information at four times the frequency of the color subcarrier, when the bit information is arriving close to the sampling rate.

BACKGROUND OF THE INVENTION

A conventional television (TV) signal contains a video signal and a second signal containing binary data. In the United states, for example, TV signals commonly carry closed caption data along with the NTSC video signal. In other countries, teletext information is carried along with a PAL video signal. Moreover, any future NTSC digital transmitting standards, such as "intercast," will allow greater amounts of data to be carried with NTSC video signals.

As multimedia personal computers (PCs) become more powerful, the capability of viewing TV in a window on a computer will become more commonplace. A multimedia PC typically has a video capture circuit for receiving the TV signal and for displaying it on the screen. The video capture circuit will also extract the closed caption or teletext information and allow it to be displayed on the screen.

In a low cost TV decoder implementation, the incoming video signal is sampled at four times the color subcarrier (4*Fsc). This frequency makes the video signal easy to decode. In addition, a TV decoder implementation sampling the incoming signa at 4*Fsc is quite effective at extracting closed caption information from an NTSC signal.

However, PAL and intercast signals carry bits at a much higher frequency than in a closed caption signal. Moreover, a sampling rate of 4*Fsc is not a convenient multiple of the bit rate of, for example, teletext information in the PAL standard. Thus, sometimes the decoder will get two samples per bit and sometimes it will get three samples per bit. Accordingly, it is very difficult to extract data from a PAL or intercast signal using a 4*Fsc sampling rate.

In the PC environment, prior art decoders use software to resample the teletext data stream. The software essentially "guesses" where the center of a bit is and whether the bit is a one or a zero. Unfortunately, such software requires valuable processing time to decode the data.

Therefore, there is a need in the art for an effective system and method for decoding teletext and other data formats using the 4*Fsc sampling rate.

SUMMARY OF THE INVENTION

The above and other needs are met by a system and method that can be used by software to extract teletext information from the video signal and present it to the software for further processing. A circuit samples the incoming television (TV) signal and interpolates it to synthesize a point between each two sample points. By taking the derivative of the oversampled stream, the circuit can find the edges, or transitions, of the signal.

Even though the system's sampling rate is not sufficient to differentiate the incoming bits, the system resamples at precisely the rate necessary to locate a point in the center of each bit, therefore extracting the ones and zeros out of the incoming stream.

I realized that the system knows how the incoming signal is structured and what it should look like. Thus, even though we use a very low sampling rate, the circuit of my embodiment provides a mechanism where the system can extract the teletext or other high bit rate data from the incoming signal and present it for processing.

One technical advantage of the inventive system is that while the typical approach in a computer environment (where television is displayed on a computer) to use extensive software processing to resample the signal, my circuit frees up software processing, since the software need only read the extracted data from the circuit, allowing for a faster update on the screen and more real time displays.

Another other technical advantage of the system and method discussed herein is that it takes advantage of low cost implementation of a TV decoder (i.e. one that is being used where the video is sampled at four times the color subcarrier) and it uses that low sampling rate by synthesizing an intermediate point and producing a pseudo higher sampling rate that is akin to a sampling rate of eight times the color subcarrier, which is fast enough to extract the desired video information.

Another technical advantage is that the system and method described herein does not try to do a complete interpretation of the data in the actual signal and therefore keeps the complexity down so that it is small and very easy to implement.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with accompanying drawings, in which.

DESCRIPTION OF THE PREFERRED EMBODIMENTS

Figure 1:
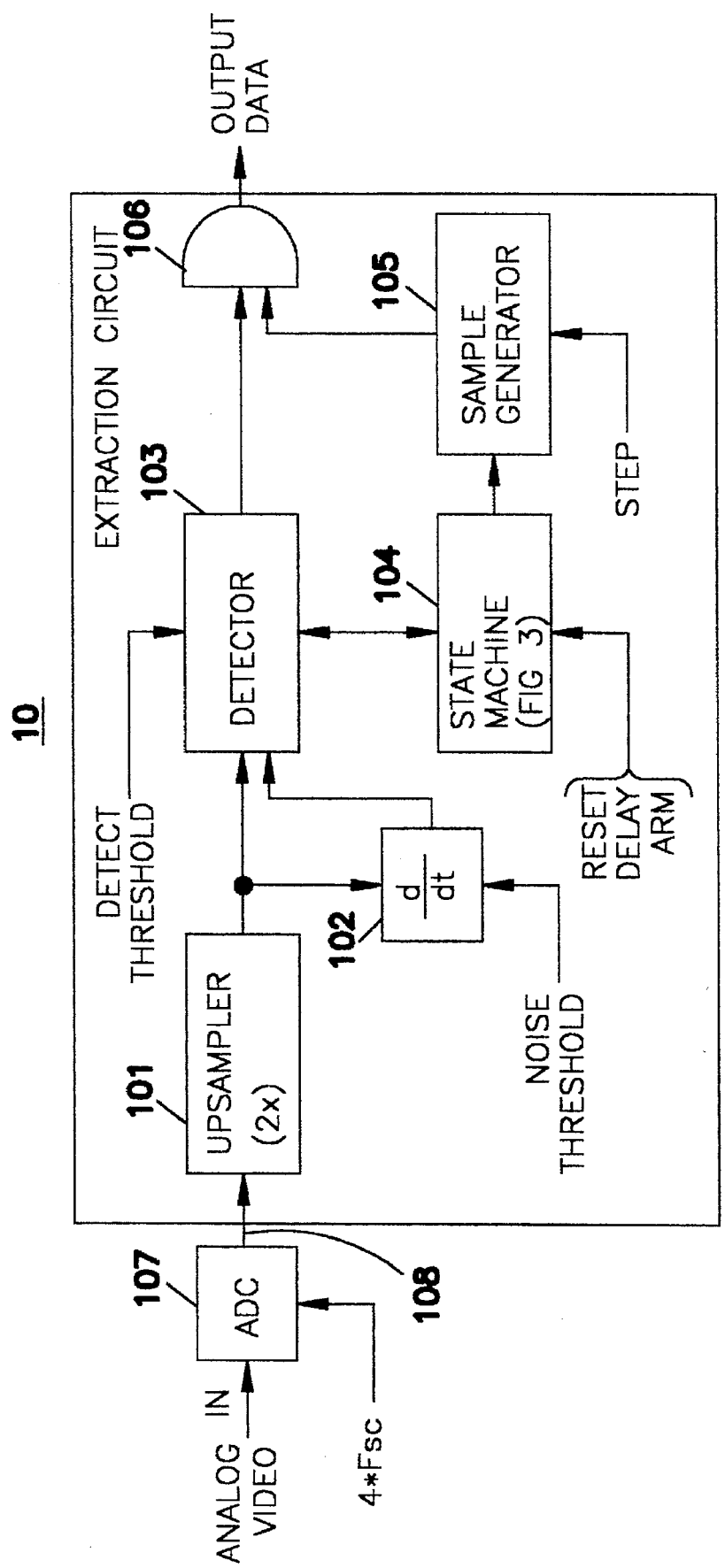
FIG. 1 shows the details of extraction circuit of the invention.

Turning now to FIG. 1, there is shown a block diagram of extraction circuit 10. The incoming video signal is provided to an input to analog to digital converter (ADC) 107, which in the case of one implementation assumes that the ADC is sampling the incoming analog video at a rate of four times the color subcarrier (4*Fsc). Thus, the input to extraction circuit 10 is actually a digital stream of the sampled video signal on lead 108, the sampling rate being four times the color subcarrier.

The incoming digitized video stream is first presented to 2× upsampler 101, which synthesizes a point by using a simple bilinear sample between very two points. For every point received by the upsampler, an output of two points will occur, with every second output point being the same as the input with the "extra" output points being an average between adjacent input points.

The output of upsampler 101 goes to two circuits, one is detector 103 and the other is circuit 102, which generates the first derivative of the signal by generating differences between adjacent points of the upsampled video signal. Detector 103 uses both the derivative output of circuit 102 and the output of the upsampler 101 to detect, using a detect threshold value which is programmed by software, whether or not each point is a one or a zero.

During this time state machine 104 monitors the video signal and detects certain events using outputs from detector circuit 103. One event that state machine 104 is attempting to find is the beginning of the first digit impulse and then using a delay value, wait until the anticipated center of that first digit impulse, at which time it will initialize sample generator 105 which, using a step value, regenerates sample times spaced such that these sample times occur once per bit time of the incoming video stream.

Combinational logic circuit 106, at the sample times generated by circuit 105, close the output of detector 103 to the output. This output is either a one or a zero coming from upsampler 101 at the clocked times.

The software parameters which are used to control extraction circuit 10 are:

a) the detection threshold value which goes to detector 103 and is used to provide the decision of whether or not the upsampled video is a one or a zero. Typically, that would be a mid-range between the maximum high and the maximum low values of the incoming signal. The maximum high and maximum low values being predefined by the standard, NTSC, PAL, or any other standard. The threshold will place the "extra" clock pulse in the center of those two values.

b) The noise threshold value which goes to derivative generator 102. The noise threshold is used by derivative generator 102 to decide when to try and find out if the signal has leveled off and not changing anymore. The noise threshold would typically be a very small number and would be used to make the derivative generator ignore very small fluctuations, thereby filtering out noise so it is not making false decisions. This number would typically be perhaps on the order of 10 out of a total of 256 for the video signal. The idea being simply to help the derivative generator detect edges and levels but not get confused by noise.

c) The delay parameter as on input to state machine 104. The delay parameter is used to specify to state machine 104 that derivative generator 102 and detector 103 have decided that the top of the first "runin" pulse has occurred. The delay parameter will specify a value of one-half the bit width of the first "runin" pulse.

d) the step parameter is provided to sample generator 105. Once state machine 104 has decided that the proper delay has occurred, i.e. the first edge has been detected, and the circuit has waited a certain delay so that it is somewhere between the leading edge and the trailing edge of the first pulse, it will start the sample generator and the sample generator will then generate samples at a rate of once per bit time defined by the step size, which would be different for teletext, intercast, NTSC, closed caption, etc.

Figure 3:
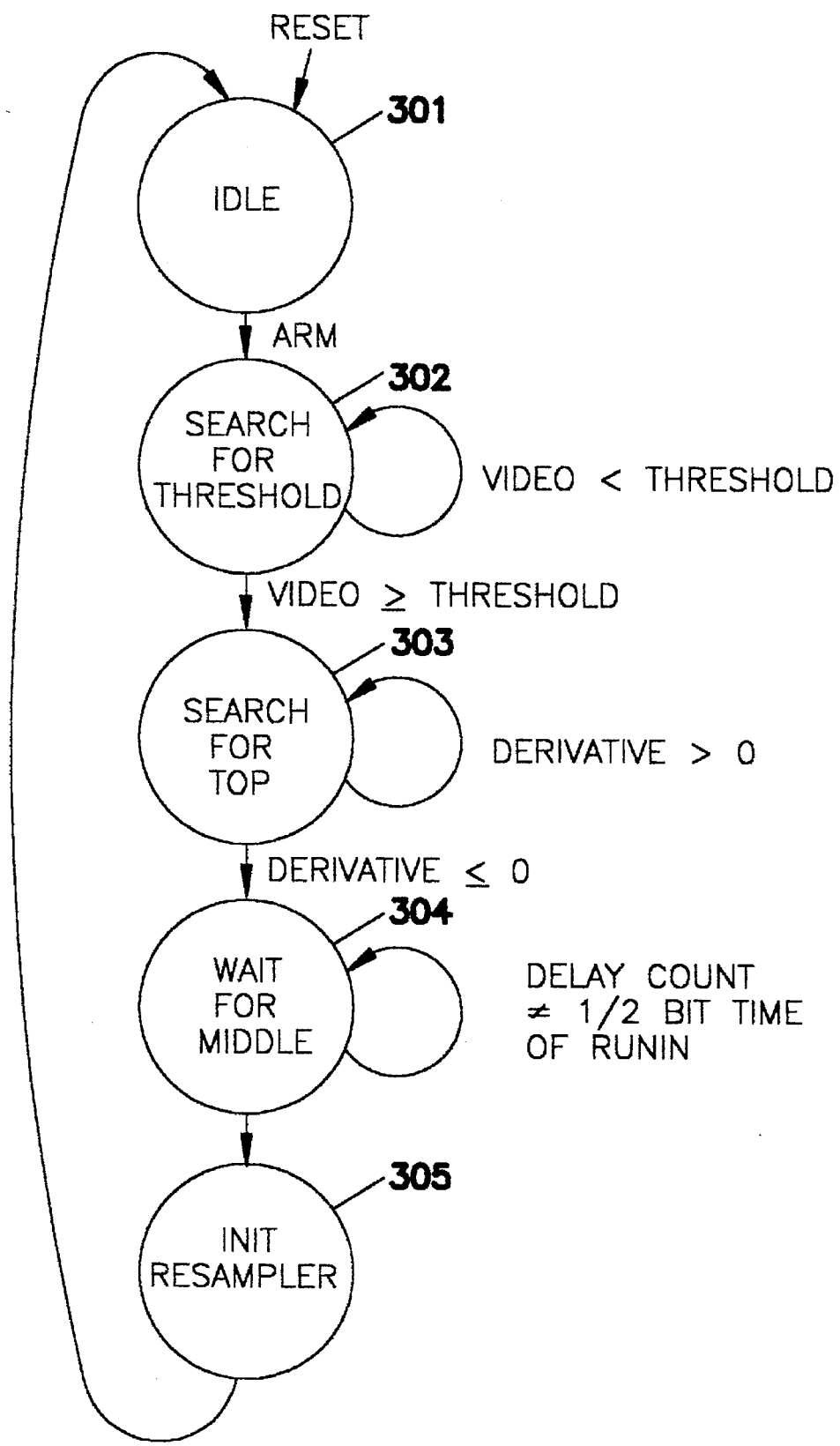
FIG. 3 is a flow chart of the typical operation of one embodiment of my invention.

FIG. 3 shows the flow of operations of what is going on in state machine 104. A reset occurs on every active line where there is closed caption. A typical method of providing the reset would be by way of a horizontal sync. This puts the state machine into idle state 301 where it is just waiting. An arm signal would be input to the state machine to tell it to start hunting for the first bit time. This arm signal would typically be generated by external circuitry sometime just after the color bust signal.

When the state machine receives the arm signal, it moves into state 302 where it uses the detection threshold, and monitors the incoming digital signal from the upsampler waiting for it to cross the detection threshold value. Until the video signal is equal to, or greater than, the threshold value, it will stay in state 302.

Once the incoming signal has risen above the threshold value, the state machine will move from 302 into the search for top state 303. This means that once we have gone into state 303, the state machine has decided that the video signal has crossed the threshold, and is at the very beginning of the first "runin" pulse. The state machine stays in state 303, searching for the top of the first pulse. The way it finds that top is by looking at the output of detector 103 which in turn is watching derivative generator 102. State 303 decides when the signal stops rising which is indicated when the derivative is less than or equal to zero. The state machine then goes to state 304, looks at the delay value, and waits for the calculated middle of the pulse. That delay value is provided by software and will be different depending on whether it is closed caption, teletext, etc. The delay value is one half of the bit time so that the delay is over when the center of the first pulse occurs. At that time, the state machine moves into init resampler state 305. At this time, state machine 104 provides a signal to sample generator 105 to start generating samples. Sample generator 105, given a step size (which is based on the closed caption, teletext, or whatever) starts generating samples once per bit time. Since the first sample is generated exactly at the center of the anticipated first pulse, every sample thereafter will be generated exactly in the center of the next bit, and the next bit, etc. The state machine is finished, for this cycle, and goes back to its idle state.

Figure 2:
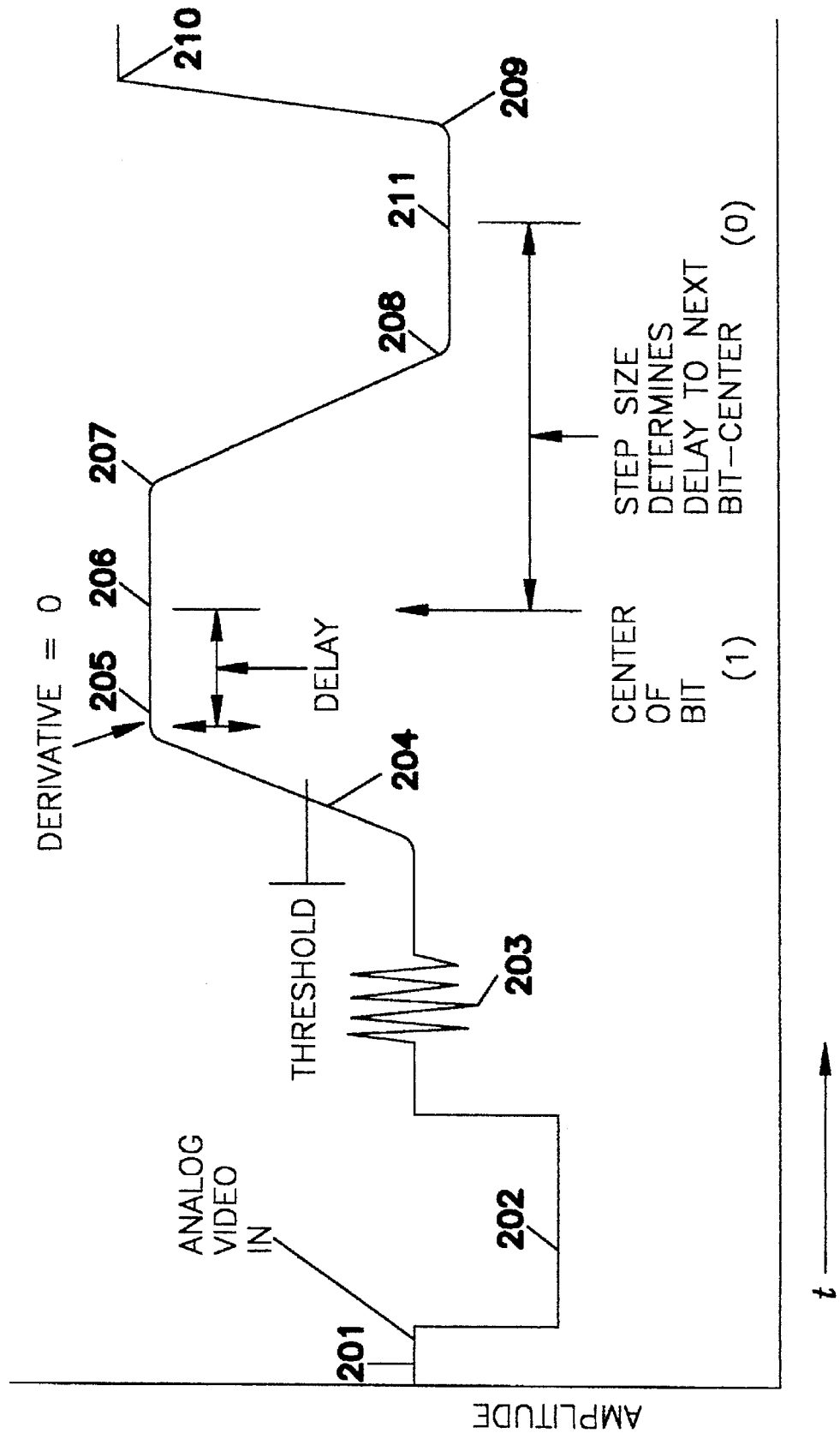
FIG. 2 shows a graph of a typical signal containing data to be extracted.

FIG. 2 shows an incoming video signal showing either a closed caption or teletext type of line to give an idea of the different events that can occur and how they apply in the signal. Signal 201 represents the signal just before horizontal synch when a cycle would likely start. Typically, the circuit would be started by horizontal sync 202, which would be used to reset the state machine. This would happen at the beginning of the closed caption teletext line. Color burst 203 represents a fixed known level, at a blank level, and it would be during this interval when external logic would arm the state machine, moving the state machine into its state 302. This would occur some time after the color burst, depending on how the hardware was implements.

State 204 represents the time when the incoming video signal is rising for the first "runin" pulse. An when it rises above also labeled in 204 the threshold value is the first event which will be detected by the state machine to decide when the signal is rising to begin the first "runin" pulse. Note that the circuit is not monitoring the video signal but rather digital representations of the signal and thus making determinations for the digital stream as to what the video would actually "look like."

Point 205 is determined when the derivative of the signal drops to zero, which means that the signal has flatted. Point 206 shows a point which is a calculated delay value from point 205 which again is software programmable and which specifies a value equal to one-half of a bit time of the first pulse (i.e. halfway between points 205 and 207).

At point 206, the state machine starts sample generator 105 (FIG. 1), initializes it, and tells it to generate a sample at this time and to generate a sample according to its step size, which, in this example, would be point 211. Thus, sample generator 105 generates samples in the center of every bit time.

In the example shown, the bits that would be sampled would be one and zero. Note that at the beginning of the desired data stream (whether it's closed caption, teletext, or whatever) there is a series of runin pulses which are going to be a series of one, zero, one, zero, one, zero, or other known sequences), so that the first bit that is actually detected at the end of the delay will always be a one, the second bit that is detected which is one bit time later, will always be a zero, followed by a one, etc. Different standards will have different patterns of ones and zeros, for instance closed caption will have a certain pattern, teletext will have a certain pattern, but the point is that these are known patterns and provides the logic circuitry something to lock on to and watch for.

Eventually in the pattern, the actual data will begin and then the bits will be a series of ones and zeros in the traditional fashion until the end of a fixed period of time which is the line length. Then the full operation will repeat itself again. External circuitry is used to decide which lines contain this information. That will be dependent on, for example, NTSC where there is only one line per every two fields per frame that actually contains any closed caption information. In the PAL standard, there are multiple lines on each field that contain teletext information.

Although the present invention and its advantages have been described in detail, it should be understood that various changes, substitutions and alterations can be made herein without departing from the spirit and scope of the invention as defined by the appended claims.

I claim:

1. A circuit for extracting data from a signal when the data is embedded in the signal at intervals and interspersed with other data and where the sampling rate of the signal which is used to convert the signal from analog to digital is slower than the data rate of the data to be extracted, said circuit comprising:

means for sampling a digital conversion of the signal to generate binary samples at a rate greater than the analog to digital sampling rate;

means for detecting from said greater binary signal samples a beginning edge of a first data bit to be extracted;

means for determining a midpoint of a data bit of said data to be extracted; and means for generating a clock signal calculated to be at the midpoint of each data bit of said data to be extracted.

2. The invention set forth in claim 1 wherein said beginning edge detecting means includes:

means for determining when a rising portion of said first data bit reaches its largest value.

3. The invention set forth in claim 2 wherein said largest value means includes means for taking a derivative of said greater binary signal.

4. The invention set forth in claim 1 further including:

means for selectively establishing a repetitive period of said calculated clock signal.

5. The invention set forth in claim 1 wherein said detecting means includes a state machine having the following states:

a threshold detection state, a top of signal detection state, a wait for the middle of the detected pulse state, and an initiate sampling state.

6. A method for extracting data from a signal when the data is embedded in the signal at intervals and interspersed with other data and where the sampling rate of the signal which is used to convert the signal from analog to digital is slower than the data rate of the data to be extracted, said method comprising the steps of:

sampling a digital conversion of the signal to generate binary samples at a rate greater than the analog to digital sampling rate;

detecting from said greater binary signal samples a beginning edge of a first data bit to be extracted;

determining a midpoint of a data bit of said data to be extracted; and generating a clock signal calculated to be at the midpoint of each data bit of said data to be extracted.

7. The method set forth in claim 6 wherein said beginning edge detecting step includes the step of:

determining when a rising portion of said first data bit reaches its largest value.

8. The method set forth in claim 7 wherein said largest value determining step includes the step of:

calculating a derivative of said greater binary signal.

9. The method set forth in claim 6 further including the step of:

selectively establishing a repetitive period of said calculated clock signal.

10. The method set forth in claim 6 wherein said detecting step includes a state machine having the following states:

a threshold detection state;

a top of signal detection state;

a wait for the middle of the detected pulse state; and an initiate sampling state.

11. A circuit for extracting certain data from a video signal, said circuit comprising:

an input for accepting a video signal;

a sampler circuit for generating outputs corresponding to samples taken of accepted video signals;

a circuit for calculating from said generated outputs a derivative output;

a circuit for calculating a beginning point of a data pulse of said data signal, said pulse having a certain width, said circuit operating on said generated outputs and on said derivative output; and a sample generator for providing a repetitive clocking pulse delayed from said calculated beginning point a certain amount and having a fixed repetition rate.

12. The invention set forth in claim 11 further including:

means for predetermining the width of each pulse of said repetitive pulse; and means for controlling said certain delay so that said clocking pulse will occur between said calculated beginning point and an end point of said pulse signal.

13. The invention set forth in claim 12 wherein said repetition rate is determined by said predetermined pulse width.

14. The invention set forth in claim 11 wherein said certain delay amount is selectable.

15. The invention set forth in claim 11 wherein said accepted video signal is a digital equivalent of an analog video signal, and wherein said circuit further includes:

means for accepting said analog video signal and converting said accepted analog signal to said digital equivalent using a sample rate which is a multiple of the frequency of the color subcarrier.

16. The invention set forth in claim 15 wherein said multiple is four.

17. The invention set forth in claim 15 wherein said analog video signal represents bits of data and said multiple is in a range such that at least one sample is taken for each bit of said analog video signal.

* * * * *